United States Patent [19]

Webb et al.

[11] 4,102,411

[45] Jul. 25, 1978

[54] DRILL STEM FOR DRILLING UPWARDLY

[75] Inventors: Daniel R. Webb, Santa Ana; John F. Steinke, Fountain Valley; Robert W. Berry, Brea; Stanard R. Funsten, Corona del Mar, all of Calif.

[73] Assignee: Smith International, Inc., Newport Beach, Calif.

[21] Appl. No.: 717,830

[22] Filed: Aug. 26, 1976

[51] Int. Cl.² ............................................. E21B 3/00
[52] U.S. Cl. .................................... 173/164; 175/320
[58] Field of Search ........................... 173/152, 164, 1; 175/320, 85, 62, 65, 170

[56] References Cited

U.S. PATENT DOCUMENTS

| | | | |
|---|---|---|---|
| 1,787,049 | 11/1930 | Brinton | 175/320 |
| 2,953,351 | 9/1960 | Bodine et al. | 175/320 |
| 3,463,247 | 8/1969 | Klein | 173/164 |
| 3,680,412 | 8/1972 | Mayer et al. | 173/164 |
| 3,917,321 | 11/1975 | Rodgers | 175/85 |

Primary Examiner—Robert A. Hafer
Attorney, Agent, or Firm—Gene W. Arant

[57] ABSTRACT

A drill stem especially adapted for use in a boring machine which drills upwardly, having pin and box joints on its respective ends, having a circumferential collar that is utilized for both vertical and rotational support of the drill stem section, and additionally having a spline connection on its lower end which is utilized for imparting rotating drive.

8 Claims, 8 Drawing Figures

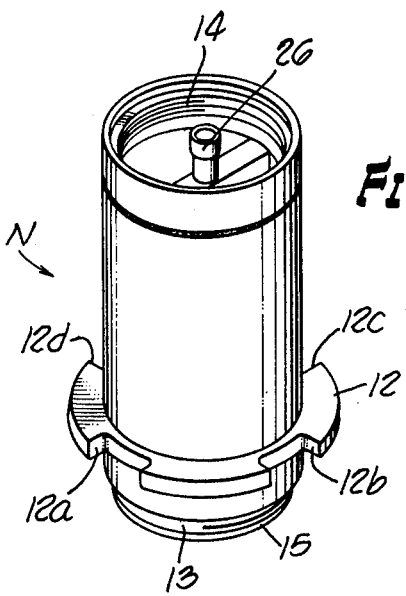
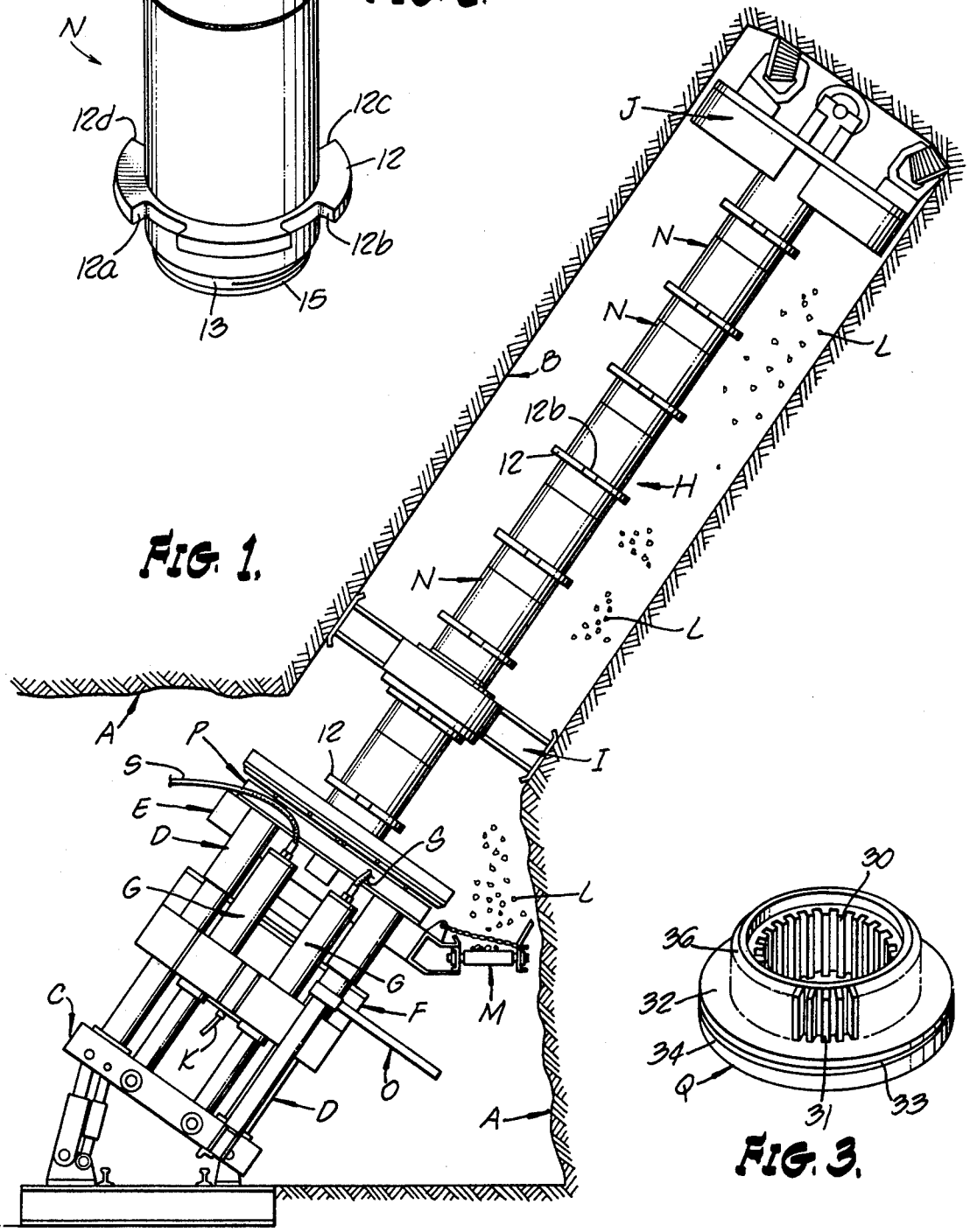

DRILL STEM FOR DRILLING UPWARDLY

PRIOR ART

The relevant prior art patents known to applicant are Klein, U.S. Pat. No. 3,554,298 and Visser, U.S. Pat. No. 3,851,714.

RELATED APPLICATION

The present invention is adapted for use with the machine and method disclosed in copending application Ser. No. 551,083, filed Feb. 20, 1975 and assigned to the same assignee as this application. The present invention has been substantially fully disclosed in that prior application.

BACKGROUND OF THE INVENTION

It has long been the practice to make up a drill string from threaded drill stem sections having a pin joint at one end and a box joint at the other end, and such drill string has been used not only in drilling oil wells but also in mining and in other applications. As the drilling advances it is necessary to add one drill stem section at a time in order to lengthen the drill string, and when the tool is being removed from the hole the drill stem sections are broken out one at a time. The procedure for adding or breaking out a drill stem section has been both time-consuming and expensive, since the drill string as a whole as well as the individual drill stem section must be separately supported each time that the threaded joint between them is made or broken and a number of separate steps have heretofore been required in the handling of the individual drill stem section.

The copending application Ser. No. 551,083 discloses a boring machine for drilling upwardly, and a novel method or process for adding or breaking out the drill stem sections which is more fully automated than the previously known methods. The drill stem of the present invention is particularly adapted for carrying out that novel method.

SUMMARY OF THE INVENTION

The drill stem section of the present invention has the usual pin and box joints at its respective ends, and additionally has a spline connection formed on its lower end. In one form of the invention the drill stem also has a circumferential collar at a mid-point along its length which is adapted to provide both vertical and rotational support.

In its preferred form the drill stem section of the present invention also includes a water tube which is of rather small diameter relative to the outer shell of the drill stem supported concentrically within the shell, the ends of the water tube having sliding joints for purpose of convenient interconnection with the water tubes of adjacent drill stem sections.

The invention also provides the combination of a drill stem and a supporting coupling ring, adapted to make or break the threaded coupling of the drill stem to a drill string in a relatively automatic fashion, with few operating steps required. According to the invention the coupling ring provides vertical support of the drill stem when needed, and otherwise provides only rotational drive for either making or breaking the threaded joint.

DRAWING SUMMARY

FIG. 1 is an elevational view of a machine with drill string extended a considerable distance upward so as to drill a tunnel upwardly but at some angle from the precisely vertical direction;

FIG. 2 is a perspective view of a single drill stem section;

FIG. 3 is a perspective view of the drive coupling ring that is utilized in conjunction with the rotary drive table or platform;

PREFERRED DRILL STEM SECTION (FIGS. 2 and 4–6)

PARTS LIST (Drill Stem Section)

| | |
|---|---|
| N | Drill Stem Section |
| 10 | Spline connection of 22 |
| 12 | Collar around 20 |
| 12a, b, c, d | Recesses in 12 |
| 13 | Pin joint (male thread) of 22 |
| 14 | Box joint (female thread) of 21 |
| 15 | Lower end face of 22 |
| 20 | Cylindrical shell |
| 21 | Upper extension of 20 |
| 22 | Lower extension of 20 |
| 23 | Inner end flange of 22 |
| 24 | Inner end flange of 21 |
| 25 | Water tube |
| 26 | Female fitting on 25 |
| 27 | O-ring in 26 |
| 28 | Male joint portion of 25 |
| 40, 41 | Transverse supports for 25 |
| N' | First alternate of N (FIG. 7) |
| 91 | Shoulder of N' |
| N'' | Second alternate of N (FIG. 8) |
| 92 | Shoulder of N'' |
| N''' | Third alternate of N (FIG. 9) |

Reference is now made to FIGS. 2 and 4–6 illustrating the presently preferred drill stem section in accordance with the present invention.

Figure 6:
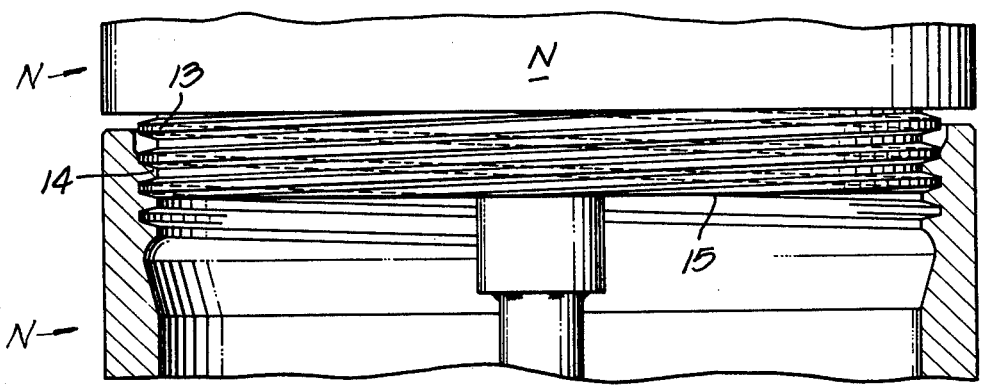
FIG. 6 is an enlarged fragmentary cross-sectional view showing the attachment together of two drill stem sections.
Figure 5:
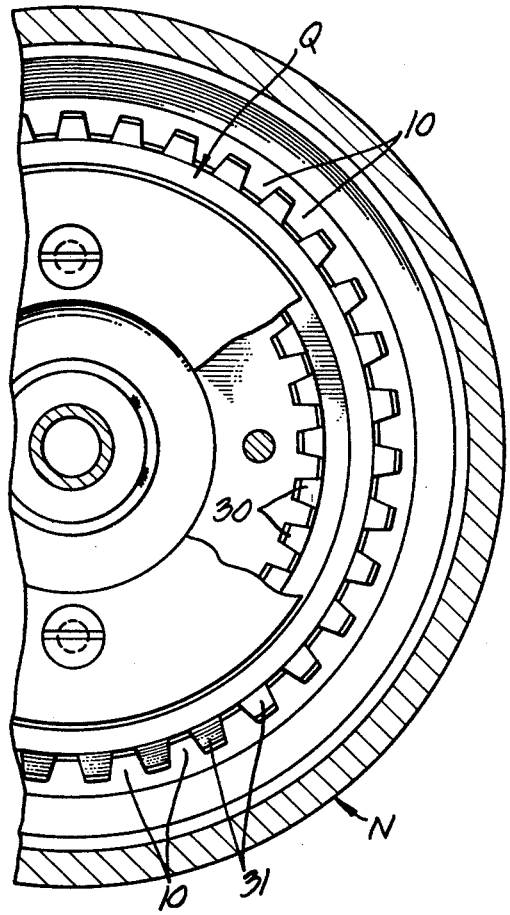
FIG. 5 is a horizontal cross-sectional view taken on the line 5—5 of FIG. 4.
Figure 4:
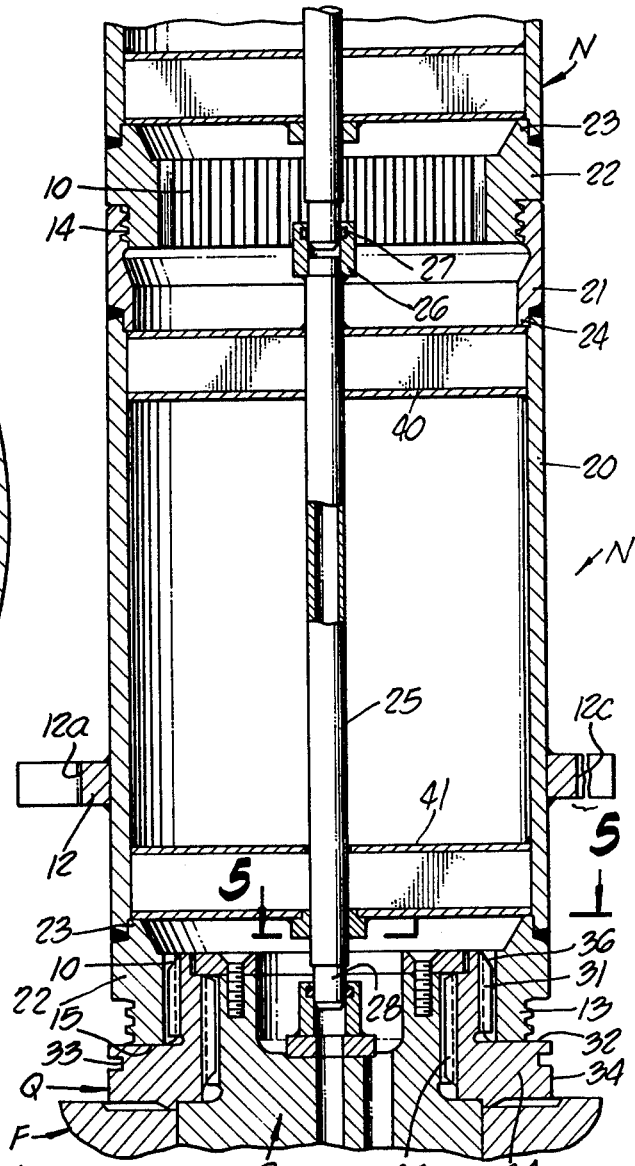
FIG. 4 is a cross-sectional elevational view of the rotary drive table, drive coupling ring, and drill stem.

The drill stem section generally designated as N includes a cylindrical shell 20 with upper and lower extensions 21, 22, respectively. Section N has a female thread or pin joint 13 on its normally lower end. An internal spline connection 10 is also formed within the lower end of the shell. A circumferential collar 12, in the form of a relatively flat flange or plate, is welded to the exterior surface of shell 20 at some distance above its lower end. Collar 12 has a set of four circumferentially spaced recesses 12a . . . 12b formed therein (FIGS. 2 and 4). A water tube 25 is of about the same length as the shell 20–22 but of much smaller diameter, i.e., the inner diameter of water tube 25 is preferably one inch while the inner diameter of shell 20 is preferably about 14½ inches. Water tube 25 is supported concentrically within the shell 20 by means of transversely extending supports 40, 41. The ends of tube 25 are provided with sliding joints, the upper end having a female fitting 26 with O-ring 27 therein, and the lower end of the tube having a reduced exterior diameter to form the male joint portion 28.

As shown in FIG. 4, the upper end portion 21 within which the female thread 14 is formed, is welded to the main portion of shell 20. The lower extension 22 in which the male thread 13 and spline connection 10 are formed is welded to the lower end of the main shell 20. The lower shell extension 22 has a radial thickness which is approximately double that of the main shell body and its upper extension 21. A flat lower end face 15 is formed on the circumferential lower end of the shell extension 22.

Both the pin joint 13 and the box joint 14 are made with a non-tapered thread. Each of these joints has a very short length relative to the length of the entire drill stem N and also relative to the customary length of pin and box joints as used in oil well drill stem. Specifically, the preferred overall length of drill stem section N is 3½ feet while the length of each tool joint 13, 14, is only about one and one-half inches.

The water tube 25 is supported from transverse supports 40, 41, each of which is a length of square metal tubing having a diameter of about two inches. At the longitudinal center of each square tube a round hole is cut in a transverse direction, being of such diameter as to receive the cylindrical water tube 25. The ends of each square tube section are cut to an arcuate configuration so as to fit within the shell 20.

Both of the tube supports 40, 41 are assembled and welded to the tube 25, and this assembly is then subsequently placed within the shell 20. Shell extension 22 has an annular flange 23 on its inner end which projects inwardly of the lower end of the main shell section 20, and the ends of tube support 41 rest upon this flange 23. Shell extension 21 has an annular flange 24 projecting from its inner or lower end, which is received within the shell section 20, and the ends of tube support 40 are confined by the flange 24. With the particular arrangement of parts as shown it is necessary to insert the tube 25 and its supports 40, 41 into the shell 20 before attaching and welding the last one of the shell extensions 21, 22.

Each of the threads 13, 14 is a non-tapered, double lead thread, the thread having a pitch of about one inch and the combination of double lead, thread structure, and undercut having a length of about 1½ inches. The advantage of such an usuually short threaded joint structure is that the boring machine can move and operate within the very confined space available in a mine drift or tunnel, and yet at the same time the drill stem section N has a reasonably good effective length. For this purpose the term "effective length" should be considered as the total length of the drill stem section minus the length of one threaded joint, i.e., the length which the particular drill stem section provides in the drill string assembly.

In the preferred embodiment as shown the outer diameter of shell 20 is about 16 inches, the pitch diameter of thread 13 is about 14½ inches, and the pitch diameter of spline 10 is about 11½ inches. The radial thickness of the lower end face 15 is therefore about 1½ inches. It is desirable to maintain a substantial thickness of the end face 15, since during the operation of the machine this surface supports the weight of the entire drill string and cutterhead.

The collar 12 is in the form of a flat circular plate having an interior opening cut to receive the shell 20, and when placed upon the shell it is then welded around the entire circumference of the shell. The recesses or notches 12a, 12b, 12c, 12d are cut in the outer peripheral edge of the collar 12 and are equally spaced around its circumference. The collar 12 is positioned some distance above the pin joint 13 so that the circumference of shell 20 may be grasped by a holding means which is also located underneath the collar. Thus the underneath surface of collar 12 may be used to provide vertical support for the drill stem section. The recesses or notches 12a . . . 12d may be used to lock the drill stem section against rotation.

MACHINE AND METHOD
(FIGS. 1, 3–5)

The machine and method disclosed in the copending application Ser. No. 551,083 are partially illustrated in drawing FIGS. 1 and 3–5. The various parts of the machine are identified on the following list:

PARTS LIST (Machine)

| | |
|---|---|
| A | Drift |
| B | Hole or Tunnel |
| C | Lower Bed |
| D | Corner Posts (4) |
| E | Upper Bed |
| F | Rotary Table |
| G | Rams (4) to Raise Table |
| H | Drill String |
| I | Stabilizer |
| J | Cutterhead |
| K | Water Line |
| L | Cuttings |
| M | Conveyor |
| N | Drill Stem Section |
| O | Drill Stem Positioner |
| P | Hair Pin Assembly |
| Q | Drive Coupling Ring |
| R | Spindle |
| S | Lift Control (for Rams) |
| 30 | Internal Spline of Q |
| 31 | External Spline of Q |
| 32 | Shoulder of Q |
| 33 | Groove in 34 |
| 34 | Base of Q |
| 36 | Chamfer of 31 |

As explained in copending application Ser. No. 551,083 the drill stem N is added to the drill string, or broken out from the drill string, without using the pin joint 13. Necessary rotary drive is supplied to the drill stem section N solely through spline connection 10 at its lower end.

When a drill stem section is about to be added to the string it is given vertical support by placing the positioner O of the machine underneath the collar 12 of the drill stem section. When the lowermost drill stem section is to be added or broken out, the section immediately above it (constituting the lowermost one of the remaining string assembly) is supported both vertically and rotationally by the hair pin assembly P. Recesses 12a . . . 12d of collar 12 are used to provide the rotational support. Drawing FIG. 1 is schematic only, and although not there shown, the lowermost collar 12 of the drill string is actually held within the hair pin assembly P. A pair of oppositely positioned lugs in the hair pin assembly engage an oppositely positioned pair of the recesses 12a ... 12d for holding the collar, and hence the associated drill stem, against rotation.

The novel method disclosed in the copending application Ser. No. 551,083 reduces the manual steps required in handling individual drill stem sections, both when adding a section to the string and when breaking out a section from the string. At a critical mid-point in either one of these procedures, the upper end of the drill stem section is threadedly coupled to the tool joint at the lower end of the string, while the spline connection at its lower end engages with the mating spline connection 31 that is provided on drive coupling ring Q. Rotary drive is imparted to the rotary table F and thence through coupling ring Q to spline connection 10, causing the individual drill stem section to move vertically relative to both the rotary platform and the drill string. The vertical movement is a result of the rotary drive and the threaded coupling to the drill string. When the drill stem section is being attached to the drill string, the drill stem section moves upwardly and completes its threaded connection at its upper end while at the same time it slides vertically upwardly relative to spline connection 31 of coupling ring Q. When the individual drill stem section is being broken out, it moves downward, and the threaded connection at its upper end becomes disengaged while its lower end slides downward toward the coupling ring. In either form of the procedure, many of the manual handling steps required by previously known methods are unnecessary.

Coupling ring Q has a flat circumferential shoulder 32 (FIG. 3) which supports lower end face 15 of drill stem section N (FIG. 4). Inside the shoulder is a raised ring portion having an external spline 31 which engages spline 10 of drill stem N. Ring Q may rotatably drive drill stem N while supporting it vertically, or alternatively, there may be a longitudinally directed relative sliding motion between the two parts. It is significant that splines 10 and 31 are longer than threads 13 and 14. During the driving rotation of the drill stem, therefore, it can run the full length of the threaded joint without exceeding the length of the splined joint.

The drill stem section of the present invention is connected in such manner that the sliding connections 26, 28 of the water pipe 25 are made or broken concurrently with the making or breaking of the threaded connection to the lowermost end of the drill string. An advantage of the small water pipe is that when a drill stem section is broken out, and the water in the entire water line is lost, and must later be replaced, that is a relatively small quantity.

Another feature of the invention, shown in FIG. 4, is that when the drill stem section N is supported on rotary platform F, the male coupling 28 of water pipe 25 is received in a mating female coupling of spindle R. This enables water line K to be operated while drilling.

ALTERNATE FORMS
(FIGS. 7-9)

Figure 7:
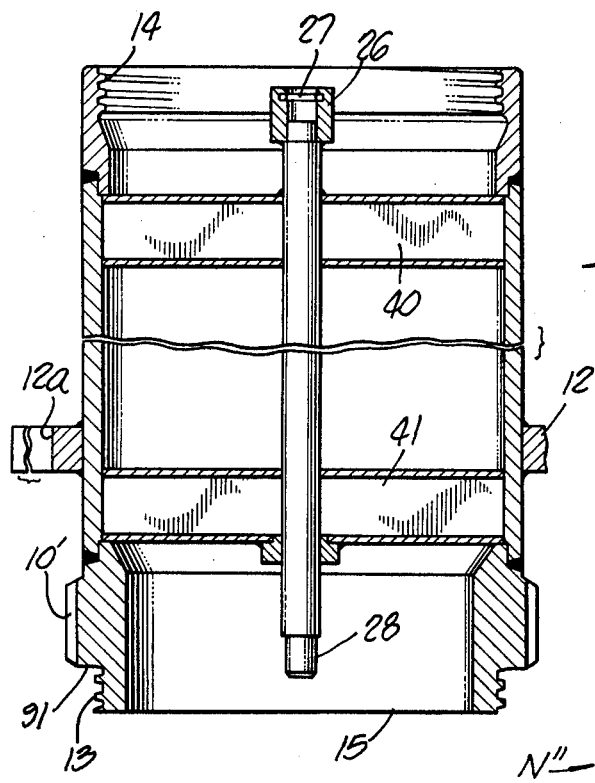
FIG. 7 is a cross-sectional elevational view, partially cut away, of a first alternate form of drill stem section in accordance with the invention.
Figure 8:
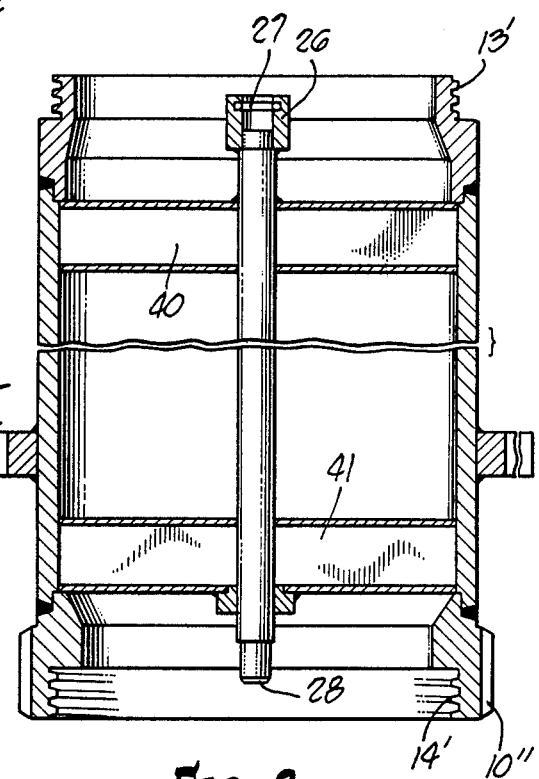
FIGS. 8 and 9 are views like FIG. 7 but showing second and third alternate forms of drill stem sections in accordance with the invention.
Figure 9:
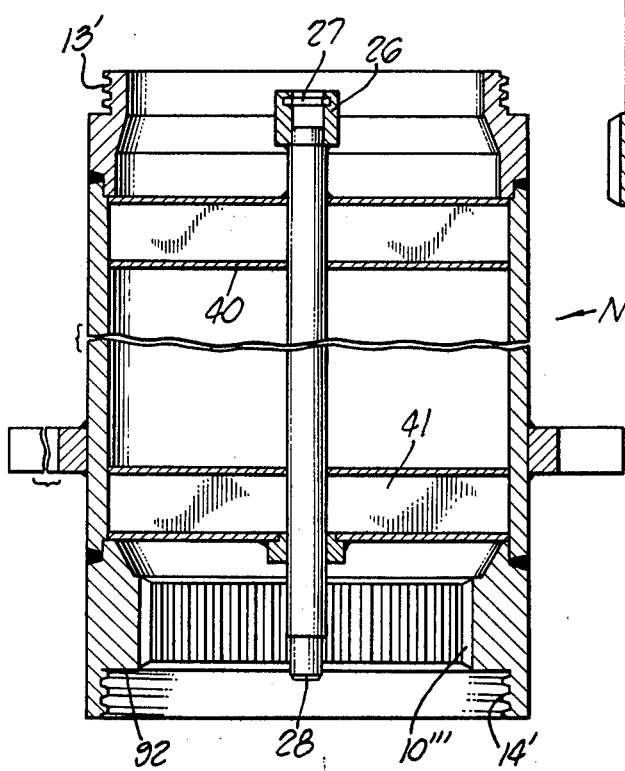

Alternate forms N', N", and N''', of the drill stem section of the present invention are shown in the drawing FIGS. 7, 8 and 9, respectively.

It will be evident that in order to use the modified drill stem sections shown in FIGS. 7, 8, and 9 it is necessary to utilize a correspondingly modified drive coupling ring, or its equivalent, in the drilling machine.

As shown in FIG. 7 the drill stem section N' has an external spline connection 10' on its lower end, together with pin joint 13, while the box joint 13 is provided on its upper end. Although not specifically shown, a mating coupling rine would have an internal spline.

As shown in FIG. 8 the drill stem section N" has an external spline connection 10" on its lower end together with box joint 14' while pin joint 13' is on its upper end. Again, a mating coupling ring would have an external spline.

As shown in FIG. 9 the drill stem section N''' has box joint 14' formed in its lower end, together with internal spline connection 10''', while pin joint 13' is formed on its upper end. A mating coupling ring, not shown, would have an external spline.

Collar 12 is the only means presently illustrated for supporting the drill stem either from positioner O or from the hair pin assembly. It will be understood, however, that if desired other support means well known in the art may be utilized instead of the collar or in addition thereto.

The invention has been described in considerable detail in order to comply with the patent laws by providing a full public disclosure of at least one of its forms. However, such detailed description is not intended in any way to limit the broad features or principles of the invention, or the scope of patent monopoly to be granted.

What is claimed is:

1. A drill stem section for use in upwardly drilling comprising:
   a generally cylindrical shell having threaded pin and box joints on its respective ends;
   a circumferential collar disposed about said shell at a location remote from both ends thereof, and being secured to said shell, said collar having at least a pair of circumferentially spaced recesses formed in the outer circumferential edge thereof, whereby said shell may be supported both longitudinally and rotationally by means of said collar; and
   said shell having a flat circumferential lower end face formed on the normally lowermost end thereof, and also having a spline connection formed in one of the circumferential surfaces of its normally lowermost end portion;
   whereby when the drill stem section is being added to or detached from a drill string it may be vertically supported underneath said flat lower end face and may be rotatably driven by means of said spline connection, and when it is part of a drill string it may be supported both vertically and rotationally from said collar.

2. A drill stem section as claimed in claim 1 which further includes a water tube which is about the length of said shell, but whose diameter is small compared to the diameter of said shell; and means supporting said water tube within said shell in concentric relationship thereto.

3. A drill stem section as claimed in claim 2 wherein said water tube is provided with longitudinally slidable, male and female coupling joints on its respective ends.

4. A drill stem section for use in drilling upwardly, comprising:
   a generally cylindrical shell, said shell having threaded pin and box joints on its respective ends whereby identical ones of said drill stem sections may be threadedly secured together;
   holding means secured to said shell at a point intermediate its ends, said holding means being adapted to support said shell longitudinally while at the same time restraining rotational movement thereof; and one end of said shell having a flat circumferential end face formed thereon, and also having a spline connection formed in one circumferential surface thereof;

whereby when the drill stem section is being added to or detached from a drill string it may be vertically supported underneath said flat end face and concurrently rotatably driven by means of said spline connection, and when the drill stem section is part of a drill string it may be supported from said holding means.

5. A drill stem section for use in drilling upwardly, comprising:

a generally cylindrical shell, said shell having a threaded pin joint on its lower end and a threaded box joint on its upper end whereby identical ones of said drill stem sections may be threadedly secured together;

holding means secured to said shell at a point intermediate its ends, said holding means being adapted to support said shell longitudinally while at the same time restraining rotational movement thereof; and the lower end of said shell having a flat circumferential end face formed thereon, and also having a spline connection formed in the interior circumferential surface thereof;

whereby when the drill stem section is being added to or detached from a drill string it may be vertically supported underneath said flat end face and concurrently rotatably driven by means of said spline connection, and when the drill stem section is part of a drill string it may be supported from said holding means.

6. A drill stem section for use in upwardly drilling comprising:

a generally cylindrical shell having a threaded box joint on its normally upper end and a threaded pin joint on its normally lower end;

a circumferential collar disposed about said shell at a location remote from both ends thereof, and being secured to said shell, said collar having at least a pair of circumferentially spaced recesses formed in the outer circumferential edge thereof;

said shell having a flat circumferential lower end face formed on the normally lowermost end thereof, and also having a spline connection formed in the interior circumferential surface of its normally lowermost end portion;

whereby when the drill stem section is being added to or detached from a drill string it may be vertically supported underneath said flat lower end face and may be rotatably driven by means of said spline connection, and when it is part of a drill string it may be supported both vertically and rotationally from said collar;

a water tube whose diameter is small compared to the diameter of said shell, which is about the length of said shell, and having longitudinally slidable coupling joints on its respective ends; and means supporting said water tube within said shell in concentric relationship therewith.

7. A drill stem section for use in upwardly drilling, comprising:

a generally cylindrical shell having threaded pin and box joints on its respective ends;

a circumferential collar disposed about said shell at a location remote from both of its ends, and secured to said shell, said collar having circumferentially spaced recesses in its outer circumferential edge, whereby said drill stem section may be vertically supported by placing support means underneath said collar and may at the same time be rotationally supported by means which engages a pair of said recesses;

a water tube having a diameter which is small compared to the diameter of said shell, being about the length of said shell, and having longitudinally slidable coupling joints on its respective ends;

support means mounting said water tube concentrically within said shell; and the normally lowermost end of said shell having a flat circumferential lower end face, and also having a spline connection formed in one of its circumferential surfaces;

whereby the drill stem section may be vertically supported underneath said lower end face and concurrently rotatably driven through said spline connection.

8. In a machine for drilling upwardly, the combination comprising;

a drill stem section having a flat circumferential end face on its normally lowermost end, said lowermost end also having a spline connection formed in its interior circumferential wall surface and a pin joint formed on its exterior surface;

said drill stem section having a box joint on its normally upper end; and a drive coupling ring having a flat circumferential shoulder adapted to support said flat end face, a ring portion formed inside of and raised above said shoulder, and a spline connection formed on the exterior circumferential surface of said ring portion and adapted to mate with said spline connection of said drill stem section;

whereby said drive coupling ring may be utilized to vertically support said drill stem section while concurrently rotatably driving the same, and also to rotatably drive said drill stem during relative longitudinal movement thereof and without vertically supporting the same.

* * * * *